United States Patent
Hirt et al.

(10) Patent No.: US 10,726,288 B2
(45) Date of Patent: Jul. 28, 2020

(54) CONTRAST SENSOR

(71) Applicant: SICK AG, Waldkirch (DE)

(72) Inventors: Günter Hirt, Waldkirch (DE); Simone Schwarz, Waldkirch (DE); Alexander Bierbaum, Waldkirch (DE)

(73) Assignee: SICK AG, Waldkirch (DE)

( * ) Notice: Subject to any disclaimer, the term of this patent is extended or adjusted under 35 U.S.C. 154(b) by 191 days.

(21) Appl. No.: 15/967,929

(22) Filed: May 1, 2018

(65) Prior Publication Data

US 2018/0322354 A1    Nov. 8, 2018

(30) Foreign Application Priority Data

May 3, 2017   (DE) .......................... 10 2017 109 469

(51) Int. Cl.
*G06K 9/00* (2006.01)
*G06K 9/20* (2006.01)
(Continued)

(52) U.S. Cl.
CPC ................ *G06K 9/209* (2013.01); *G01J 1/44* (2013.01); *G01S 7/4815* (2013.01); *G01S 17/04* (2020.01);
(Continued)

(58) Field of Classification Search
CPC ..... G01J 1/44; G01J 2001/446; G01S 17/026; G01S 17/50; G01S 7/4815; G01V 8/12;
(Continued)

(56) References Cited

U.S. PATENT DOCUMENTS

2009/0283601 A1* 11/2009 Schultze ............ B65H 23/1882
                                                                235/470
2016/0070943 A1*  3/2016 Zhu .................... G06K 7/10544
                                                                235/462.33
(Continued)

FOREIGN PATENT DOCUMENTS

DE        102004001338 A1    8/2005
DE        102008024104 A1    5/2010
(Continued)

OTHER PUBLICATIONS

Office Action dated Jan. 17, 2018 issued in corresponding German Application No. 102017109469.5.
(Continued)

*Primary Examiner* — Xin Jia
(74) *Attorney, Agent, or Firm* — Nath, Goldberg & Meyer; Jerald L. Meyer

(57) ABSTRACT

A contrast sensor for evaluating identification markings and a method of evaluating identification markings on detecting objects using a contrast sensor, having at least one light transmitter and at least one light receiver, with the light receiver having a single photodiode; having a control and evaluation unit for evaluating the light receiver signal of the light receiver, and having an output for a sensor signal that is formed by the control and evaluation unit on the basis of the light receiver signal, wherein the identification marking has lettering or a marking; an elongate illumination field is projected by the light transmitter onto a region of the identification marking narrow in the direction of movement; and the control and evaluation unit compares a reception signal sequence having a plurality of contrast transitions with a stored reception signal sequence and outputs the sensor signal in dependence on the comparison.

14 Claims, 4 Drawing Sheets

(51) Int. Cl.
*G01S 7/481* (2006.01)
*G01V 8/12* (2006.01)
*G01S 17/50* (2006.01)
*G06K 7/14* (2006.01)
*G06K 7/10* (2006.01)
*G01S 17/04* (2020.01)
*G01J 1/44* (2006.01)
*G06K 9/32* (2006.01)
*G06K 9/62* (2006.01)
*G06K 19/06* (2006.01)

(52) U.S. Cl.
CPC ............ *G01S 17/50* (2013.01); *G01V 8/12* (2013.01); *G06K 7/10712* (2013.01); *G06K 7/1404* (2013.01); *G06K 7/1417* (2013.01); *G06K 9/2027* (2013.01); *G06K 9/325* (2013.01); *G06K 9/6212* (2013.01); *G06K 19/06037* (2013.01); *G01J 2001/446* (2013.01); *G06K 2209/01* (2013.01)

(58) Field of Classification Search
CPC ......... G06K 19/06037; G06K 2209/01; G06K 7/10712; G06K 7/1404; G06K 7/1417; G06K 9/2027; G06K 9/209; G06K 9/325; G06K 9/6212
See application file for complete search history.

(56) References Cited

U.S. PATENT DOCUMENTS

2016/0140374 A1* 5/2016 Ye .................. G06K 7/1491
  235/437
2018/0203102 A1* 7/2018 Wang ............... G01S 7/4817

FOREIGN PATENT DOCUMENTS

EP 0731416 A2 9/1996
EP 0892280 A2 1/1999

OTHER PUBLICATIONS

Deuil, "Competence Guide Direct Part Marketing", SICK AG, Germany 2007.

* cited by examiner

CONTRAST SENSOR

The present invention relates to a contrast sensor for evaluating identification markings on detection objects, having at least one light transmitter and at least one light receiver, wherein the light receiver has a single photodiode; having a control and evaluation unit for evaluating the light receiver signal of the light receiver; and having an output for a sensor signal that is formed by the control and evaluation unit on the basis of the light receiver signal. The invention further relates to a method of evaluating identification markings of detection objects, having at least one light transmitter and at least one light receiver; having a control and evaluation unit for evaluating the light receiver signal of the light receiver, and having an output for a sensor signal that is formed by the control and evaluation unit on the basis of the light receiver signal.

In packaging processes of products, product-dependent identification markings such as best before dates or batch identification markings are printed or marked on the products or on the packaging.

Such codes, for example barcodes or serial numbers, have previously been read and verified by code readers or camera systems.

If the system no longer reads the code, the production process is stopped even though the code can nevertheless still be easily recognized by a consumer, for example.

It is, however, often sufficient for simple packaging machines and print systems to check the presence of the identification marking per se. It can be assumed in these systems that if a print is present, it is also correct. It is therefore necessary to recognize whether an identification marking system is working in principle or if it is not necessary to read the identification marking.

It is an object of the invention to provide a contrast sensor that is simple to handle and to set up and that is able to check or identify identification markings. It should, for example, be recognized whether a printed piece of information, a date code, a data matrix code and/or a barcode is present or not in a specific positional region. It should furthermore be recognized whether an identification marking differs from a desired quality or not. It should furthermore be recognized whether an identification marking is present completely or not. The sensor should therefore, for example, recognize a print having agreement criteria within a predefined tolerance range and to signal this via a switching output.

The object is satisfied in accordance with claim 1 by a contrast sensor for evaluating identification markings on detection objects having at least one light transmitter and at least one light receiver, wherein the light receiver has a single photodiode; having a control and evaluation unit for evaluating the light receiver signal of the light receiver; and having an output for a sensor signal that is formed by the control and evaluation unit on the basis of the light receiver signal, wherein the detection object has lettering or a mark as the identification marking; wherein an illumination field is projected by the light transmitter onto a region of the identification marking that is narrow in the direction of movement; and wherein the control and evaluation unit is configured to compare a reception signal sequence having a plurality of contrast transitions with a stored reception signal sequence and the sensor signal can be output in dependence on the comparison result.

The object is further satisfied by a method for evaluating identification markings of detection objects having a contrast sensor; having at least one light transmitter and at least one light receiver with a control and evaluation unit for evaluating the light receiver signal of the light receiver; having an output for a sensor signal that is formed by the control and evaluation unit on the basis of the light receiver signal, wherein the identification marking has lettering or a marking; wherein an illumination field is projected by the light transmitter onto a region of the identification marking that is narrow in the direction of movement; and wherein the control and evaluation unit compares a reception signal sequence having a plurality of contrast transitions with a stored reception signal sequence and outputs the sensor signal in dependence on the comparison result.

The light receiver is a single photodiode. There is thus no array of photodiodes and thus also no camera that records images.

A degree of agreement with taught features, patterns or contrast sequences is converted into a recognition value and evaluated in a comparing manner in accordance with the invention. It is therefore determined in accordance with the invention whether lettering is present or not, for example. It can even be determined whether specific lettering that has been taught previously is present or not without the sensor being able to read the writing.

The identification marking is, for example, lettering having a letter height of 3 to 4 mm with 1 to 2 lines having up to approximately 20 characters of the writing. An identification of a single line of the lettering or of a part thereof is frequently sufficient in this respect in accordance with the invention.

The following error sources on printing can be detected by the sensor, for example: No cartridge inserted; Toner empty; Uneven surfaces produce distortion or blurring of the identification marking; and The product has too small a surface, whereby the print has not been completely applied to the object.

In accordance with the invention, an inexpensive and fast sensor for presence recognition is formed. The content of the lettering or of the marking is not read. A better recognition is in particular possible by the sensor in accordance with the invention with objects that, for example, have curved surfaces or in which interference light is present or in particular with tight space conditions.

No strictly periodic patterns are required for the use.

The teaching takes place, for example, via a simple teaching function that is still variable at a later date by a sensitivity setting, i.e. without the sensor having to be taught again.

The result of the teaching process is optionally displayed with a quality indication.

After the teaching, an adaptation of the detection accuracy can take place via different sensitivity stages. The sensitivity setting, for example in stages of 1 to 9, controls the kind of evaluation. At higher stages other evaluation algorithms are optionally used.

A "fingerprint" or a representation of the contrast profile is fixed by determination of different parameters during teaching which are recognized again in a detection window.

In a first step, for example, the detection window is fixed in the control and evaluation unit.

Path speeds of the detection objects amount to approximately 0.1 to 4 meters a second, in part up to 10 meters a second or up to 70 identification markings a second. The identification marking is moved past the sensor at these speeds so that the identification marking is continuously illuminated by the illumination field and is detected by the light receiver and can be evaluated by the control and evaluation unit.

The elongate illumination field is operated transversely to the direction of the material or object movement. The width of the illumination field therefore indicates the extent of the illumination field in the direction of the material or object movement. The width of the illumination field is preferably smaller than the structural size of the identification marking. The direction of the object movement typically takes place in one direction, i.e. one-dimensionally.

The sensor is in this respect only active in a predefined, contiguous and local detection window along the material or object.

In principle, a signal extent is saved during the teaching as a collection of individual abstract data points or as a reception signal sequence. These data points describe changes in the brightness development and include information on the contrast and time stamps in a teaching window or a detection window.

The recording of significant brightness fluctuations in the detection window takes place as a reception signal sequence in detection operation. They are in turn buffered or stored at least temporarily for further processing.

After a recording at the end of the detection window, a pre-processing and processing of the signal points or of the reception signal sequences and an evaluation with reference to comparison criteria take place.

A location of agreements takes place in the processing by a comparison of the reception signal sequence in the detection window with the reception signal sequence of the identification marking stored during the teaching process.

The comparison takes place, for example, with reference to a plurality of different characteristics of the signal points or of the reception signal sequence.

The contrast, namely the relative contrast change of the reception signal of the identification marking, forms one characteristic.

A further characteristic is formed by a time stamp, namely the point in time of a contrast change in the detection window in the reading direction. To be insensitive with respect to displacements of the total print within the reading window, the time stamp is evaluated relatively with respect to adjacent contrast changes.

Different criteria are now used for the evaluation of the comparison result in dependence on the sensitivity stage selected by the user.

Only the counting of the contrast transitions of the reception signal sequence on the measurement sequence and a comparison with the number of the teach contrast transitions of the stored reception signal sequence are provided at the coarsest sensitivity stage.

The results of the association of the points are likewise compared on a check of the agreement in addition to the previously evaluated criteria at the sensitivity stages in the middle range.

At the finest sensitivity stages, the contrast transitions are again illuminated in detail.

The sensor is therefore able to evaluate the similarity of an identification marking or print to a taught reference. A statement on the content or legibility of a print independently of this reference is not implemented. This is an essential difference from the possibilities of image-based systems.

In accordance with the invention, the features should generally be speed-independent. However, time-based features under the assumption of a constant speed in the detection window can be taken into account for a high detail faithfulness with a fine resolution, i.e. at high sensitivity.

A setting of the sensor, for example of the sensitivity, takes place, for example, via a control panel having a display, via a setting line and a setting tool, for example a personal computer or similar, or via a communication interface, e.g. an 10 link.

In a further development of the invention, at least two light transmitters, and particularly preferably three light transmitters, are arranged in a row. The adaptation of the illumination field takes place, for example, by an engaging or disengaging of the light transmitters. Provision can, however, also be made to carry out an adaptation of the illumination field by an adjustable, variable aperture in front of the transmitter.

It is in this respect, for example, a segmented LED structure of 3 white LEDs in chip construction. These LEDs are controlled by the control and evaluation unit such that illumination fields of different sizes are presented, whereby integration regions of different sizes are formed. The light transmitters or LEDs are in this respect preferably arranged particularly close to one another. It is also conceivable to mix the irradiation characteristics of the 3 LEDs by an optical element.

The modularity of the illumination field size permits a better adaptation to the respective application.

The light transmitter or light transmitters are optionally formed by an RGB light emitting diode, whereby the individual prime colors can be produced independently of one another, whereby any desired fluorescent colors can be produced. The illumination color can thereby be directly adapted to the identification marking, in particular to increase the contrast in the reception signal.

In a further development of the invention, the width of the illumination field has a structural size that at most corresponds to the structural size of the identification marking and at least corresponds to a dot or line thickness of the identification marking.

The structural size of the identification marking can, for example, be the width or length of letters, numbers, or characters.

The dot or line thickness of the identification marking is determined, for example, by the resolution of the printer of the identification marking, that is, for example, the dot size in a data matrix or the line thickness in a letter or number or character identification marking.

In a further development of the invention, the width of the illumination field or of the light spot amounts to approximately 0.6 mm and the height of the illumination field or of the light spot amounts to approximately 6 mm with a detection range of approximately 13 mm. The light spot size is correspondingly larger in a further optical system having a detection range of 25 mm. The larger light spot can in particular be used with coarser structures.

The width, preferably in the feed direction of the material of the illumination field, is preferably reduced to 0.6 mm to be able to image typical structural sizes of dot matrix prints having dot sizes of 0.3 to 0.4 mm.

The suitable height of the illumination field is dependent both on the height of the identification marking or of the print and on the process fluctuations, for example on the lateral offset of the material.

Higher detection ranges of, for example, 25 mm can, however, also be provided having larger illumination fields.

In a further development of the invention, a detection accuracy, that is the degree of agreement between the reception signal sequence and a stored reception signal sequence can be set. The desired degree of recognition or the desired recognition tolerance can thereby be set individually.

In a further development of the invention, the background signal is stored.

In this respect, in a first teaching process, the background is, for example, taught and, in a second teaching process, the identification marking is taught together with the background. The pure lettering can thereby be isolated by the control and evaluation unit, for example, by removing the background, whereby the lettering can also still be identified with a changing background.

The storage of the signal developments takes place separately for the background teaching window, that is also for the teaching of the lettering.

In a pre-processing, the masking of the background detected during the teaching with respect to the measurement signal takes place. For this purpose, the contrast fluctuations measured during teaching are associated with fluctuations in the detection that are as similar as possible and the signals points are deactivated for the later processing.

In a further development of the invention, the control and evaluation unit is configured to determine at least one start trigger from the identification marking, with the reception signal sequence being able to be evaluated for a constant time period from the start trigger onward.

Provision can also alternatively be made that the control and evaluation unit is configured to determine at least one start trigger from an input signal, with the reception signal sequence being evaluated for a constant time period from the start trigger onward.

Provision can furthermore also alternatively be made that the control and evaluation unit is configured to determine at least one start trigger and at least one end trigger from an input signal, with the reception signal sequence between successive start triggers and end triggers being evaluated.

The trigger is, for example, directly specified by an external control in the process and is provided at at least one input of the sensor. The control and evaluation unit evaluates the trigger.

Alternatively, an external piece of positional information can be supplied at an input of the sensor, for example from an external control or from a rotary encoder. The control and evaluation unit can be configured to determine a start trigger and an end trigger from the piece of positional information, with the reception signal sequence between sequential start and end triggers being evaluated so that the detection window is predefined over a path distance.

The detection window consequently agrees with the identification marking region or print region to be monitored.

Provision can furthermore be made to derive a start trigger and an end trigger from the identification marking or lettering. In addition to a time monitoring between the start trigger and the end trigger, a path monitoring is preferably provided, with it being determined whether all the features of the identification marking are present between the start trigger and the end trigger. The sensor can thereby also be used at different speeds.

In a further development of the invention, a plurality of reception diodes are arranged in a row.

The contrast profile having a plurality of reception diodes in the longitudinal direction is hereby better suitable for recognition. A larger region can hereby be detected in a spatially resolved manner.

The invention will also be explained in the following with respect to further advantages and features with reference to the enclosed drawing and to embodiments. The Figures of the drawing show in:

FIG. 1 a contrast sensor;
FIG. 2 to FIG. 5 a respective identification marking on an object or article;
FIG. 6 an identification marking during teaching and during a detection;
FIG. 8 a first threshold and a contrast signal; and
FIG. 9 a second threshold and a contrast signal.

FIG. 1 shows a contrast sensor 1 for evaluating an identification marking 2 of detection objects 7 having at least one light transmitter 3 and at least one light receiver 4, wherein the light receiver 4 has a single photodiode; having a control and evaluation unit 5 for evaluating the light receiver signal of the light receiver 4; and having an output 6 for a sensor signal that is formed by the control and evaluation unit 5 on the basis of the light receiver signal, wherein the identification marking has lettering or a mark, an elongate illumination field 8 is projected by the at least one light transmitter 3 onto at least a part of the identification marking 2 and the control and evaluation unit 5 is configured to compare reception signal sequences having a plurality of contrast transitions with a stored reception signal sequence and the sensor signal can be output in dependence on the comparison.

The contrast sensor 1 is arranged, for example, at a printing machine, at a packaging machine, at a processing machine for products, etc.

The light transmitter 3 is, for example, formed by one or more light emitting diodes or laser diodes. The light receiver 4 is, for example, formed by one or more photodiodes. The contrast sensor 1 can, for example, be configured as a light sensor, according to which the light transmitter 3 and the light receiver 4 are arranged in a common housing in which the control and evaluation unit 5 is also arranged.

FIG. 2 shows an identification marking 2 with a one-line data indication and a time that is, for example, printed on a beverage packaging with an image as the background.

FIG. 3 shows an identification marking 2 with two-line lettering, for example a data indication in a first line and additional lettering in a second line with a serial number, for example. Image elements, for example a décor of a yoghurt lid are likewise located in the background.

FIG. 4 shows a cap of a bottle having a two-dimensional dot code or a data matrix code as the identification marking 2. The identification marking 2 is in this respect outwardly curved and is arranged on a partly shiny background.

Figure 1:
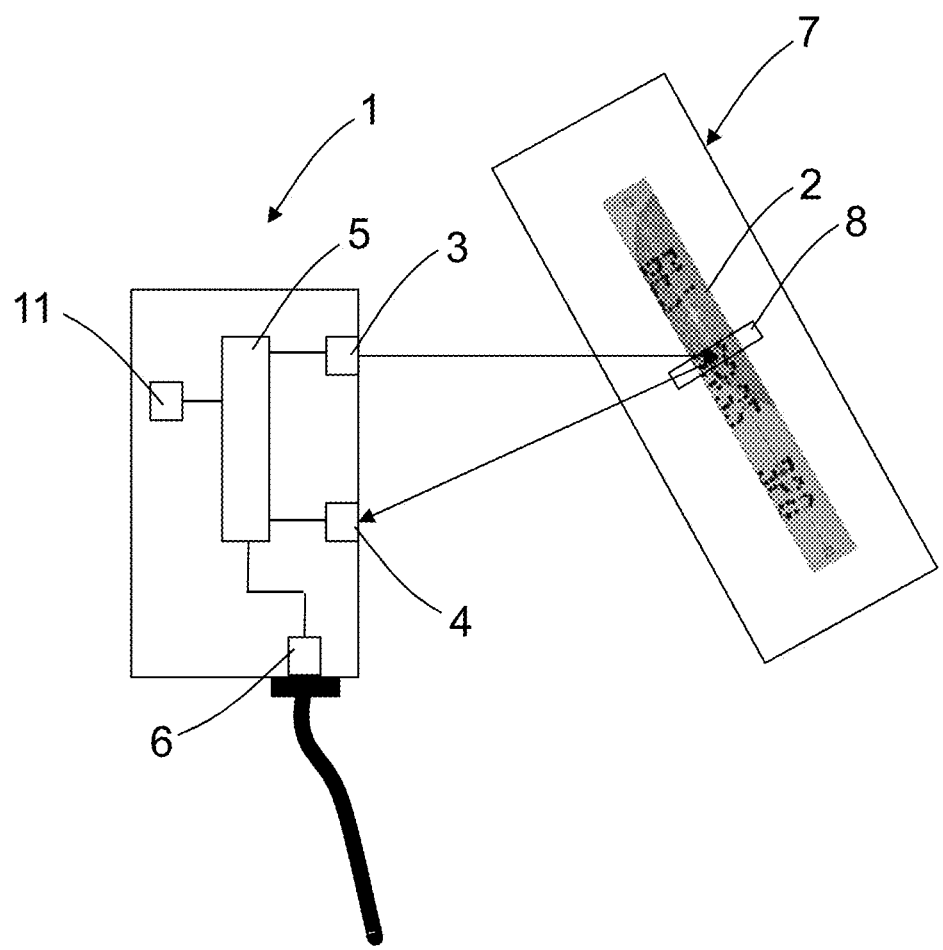
Figure 2:
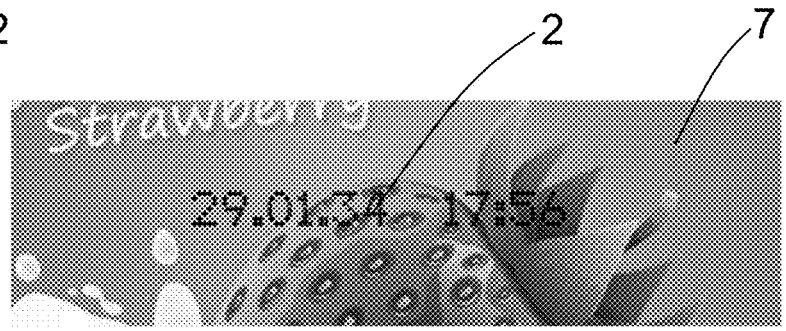
FIG. 2 to FIG. 5 show different identification markings 2 on different objects or detection objects 7.
Figure 3:
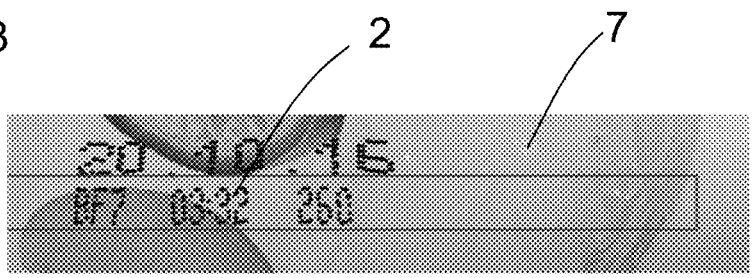
Figure 4:
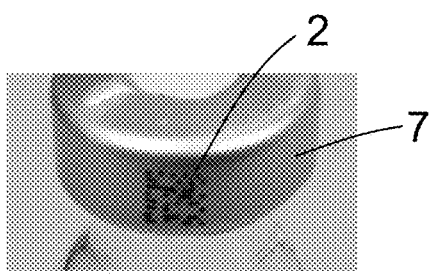
Figure 5:
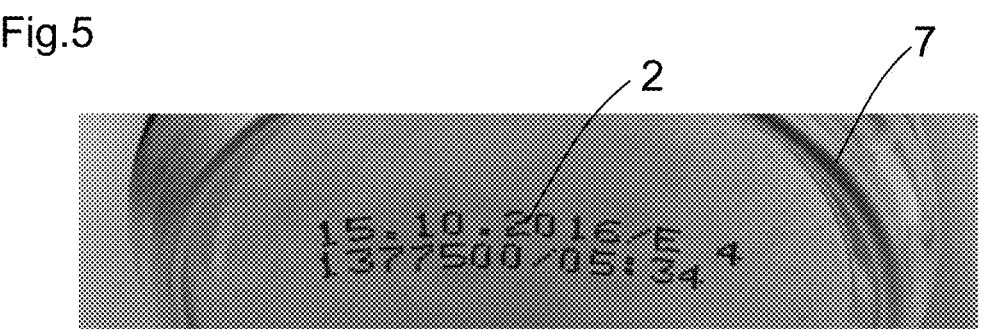

FIG. 5 in turn shows an identification marking 2 with two-line lettering, for example a data indication in a first line and additional lettering in a second line with a serial number, for example. The identification marking 2 is in this respect inwardly curved and is located, for example, at a base of an aluminum beverage can so that the background is partly shiny.

Figure 6:
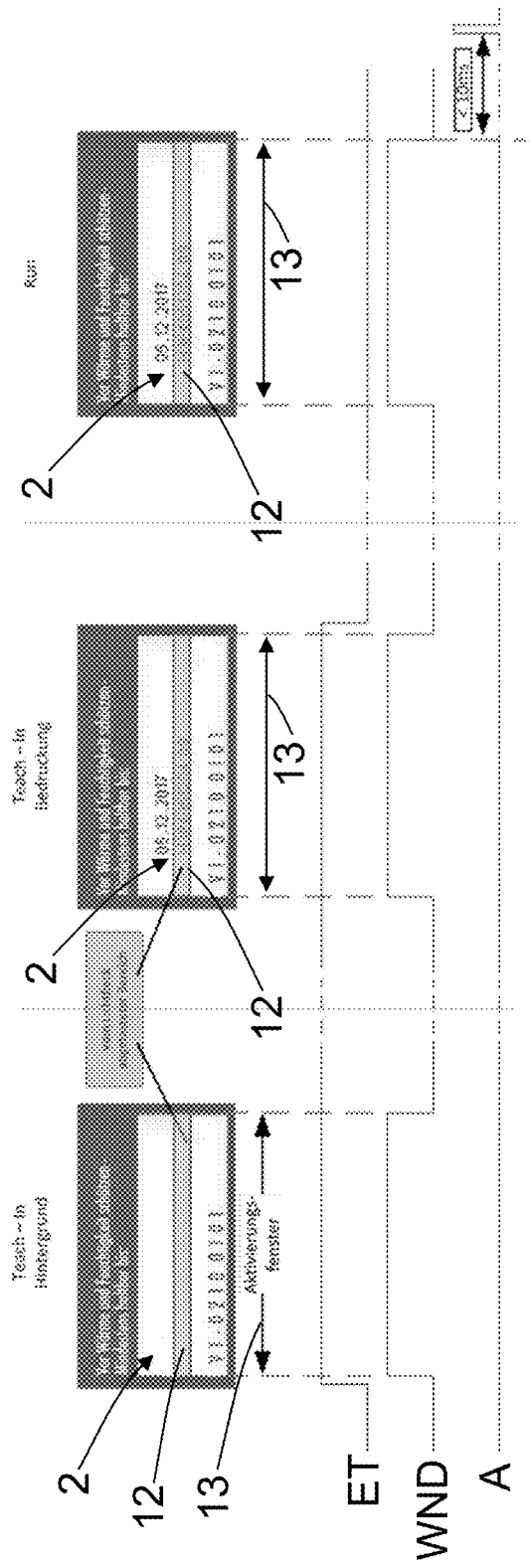

FIG. 6 shows a first identification marking 2 without lettering to be scanned that is used to teach a background in a first teaching step. The region 12 is continuously scanned by the illumination field during the detection window 13.

FIG. 6 further shows a second Figure identification marking 2 having lettering to be scanned that is used to teach the lettering together with the background in a second teaching step. The region 12 is in turn continuously illuminated by the illumination field and is scanned by the light receiver and the control and evaluation unit during the detection window.

FIG. 6 further shows the second identification marking 2 with the lettering to be scanned to detect the lettering of the identification marking and to analyze whether the identification marking is present or not.

In FIG. 6, a first input signal ET and a second input signal WND, standing for window, is shown. The first input signal ET stands for teaching and indicates that the sensor should learn the detected identification marking 2. The second input signal WND indicates when the detection window 13 should be activated and when not. An output signal A is further indicated that indicates a validly detected identification marking 2, with the output signal being output, for example, within 10 ms after a detection has taken place.

Figure 7:
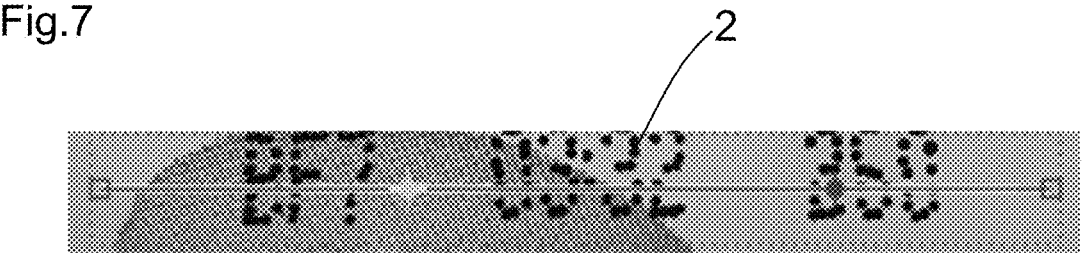
Figure 8:
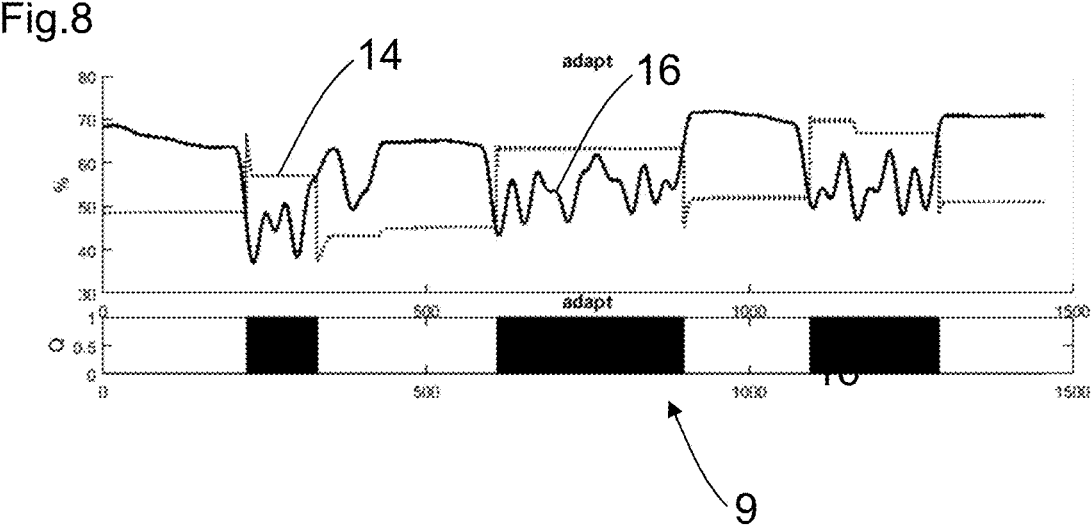
Figure 9:
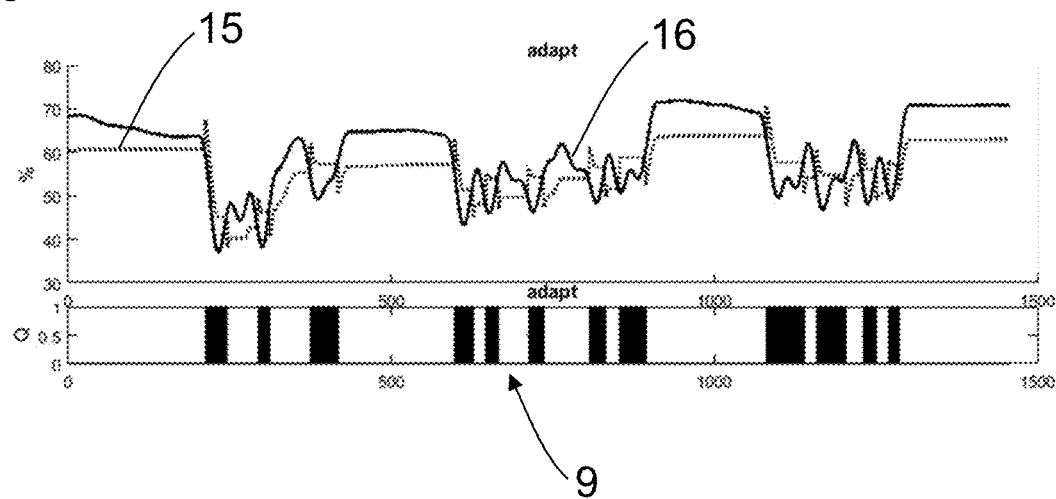

FIG. 7 shows a further identification marking 2 having lettering and a background, with the signals detected by the contrast sensor being shown in FIG. 8 and FIG. 9.

FIG. 8 shows a scanning signal or contrast signal or light receiver signal 16 that is compared with a first threshold 14. The first threshold 14 is a threshold automatically tracked by the control and evaluation unit. A result signal is produced from this and has the recognized features as a binary signal or as the reception signal sequence 9.

FIG. 9 shows a scanning signal or contrast signal or light receiver signal 16 that is compared with a second, more sensitive threshold 15. The second threshold 15 is likewise a threshold automatically tracked by the control and evaluation unit. A result signal is produced from this that has the recognized features as a binary signal or as the reception signal sequence 9, with more features having been recognized than in the example in accordance with FIG. 8.

| Reference numerals: | |
| --- | --- |
| 1 | contrast sensor |
| 2 | identification marking |
| 3 | light transmitter |
| 4 | light receiver |
| 5 | control and evaluation unit |
| 6 | output |
| 7 | detection object |
| 8 | elongate illumination field |
| 9 | reception signal sequence |
| 10 | contrast transitions |
| 11 | memory |
| 12 | region |
| 13 | detection window |
| 14 | first threshold |
| 15 | second threshold |
| 16 | light reception signal |

The invention claimed is:

1. A contrast sensor for evaluating identification markings on detection objects, the contrast sensor comprising:
at least one light transmitter and at least one light receiver, wherein the light receiver has a single photodiode;
a control and evaluation unit for evaluating a light receiver signal of the light receiver; and
an output for a sensor signal that is formed by the control and evaluation unit on the basis of the light receiver signal,
wherein the detection object has lettering or a marking as the identification marking,
wherein an illumination field is projected by the at least one light transmitter onto a region of the identification marking narrow in a direction of movement,
wherein the control and evaluation unit is configured to compare a reception signal sequence having a plurality of contrast transitions with a stored reception signal sequence and the sensor signal can be output in dependence on the comparison result, and
wherein the at least one light transmitter comprises at least two light transmitters, the at least two light transmitters being arranged in a row such that a geometry of the illumination field can be adapted by an engaging or disengaging of selected ones of the at least two light transmitters.

2. The contrast sensor in accordance with claim 1, wherein the at least two light transmitters comprise at least three light transmitters arranged in a row so that the geometry of the illumination field can be adapted by an engaging or disengaging of selected ones of the at least three light transmitters.

3. The contrast sensor in accordance with claim 1, wherein a width of the illumination field has a structural size that at most corresponds to the structural size of the identification marking and at least corresponds to a dot or line thickness of the identification marking.

4. The contrast sensor in accordance with claim 1, wherein a detection accuracy, that is the degree of agreement between the reception signal sequence and a stored reception signal sequence, can be set.

5. The contrast sensor in accordance with claim 1, wherein a background signal is stored.

6. The contrast sensor in accordance with claim 1, wherein the control and evaluation unit is configured to determine at least one start trigger from the identification marking, with the reception signal sequence being able to be evaluated for a constant time period from the start trigger onward.

7. The contrast sensor in accordance with claim 1, wherein the control and evaluation unit is configured to determine at least one start trigger from an input signal, with the reception signal sequence being evaluated for a constant time period from the start trigger onward.

8. The contrast sensor in accordance with claim 1, wherein the control and evaluation unit is configured to determine at least one start trigger and one end trigger from an input signal, with the reception signal sequence between sequential start and end triggers being evaluated.

9. A method of evaluating identification markings of detection objects comprising the steps of:
providing at least one light transmitter and at least one light receiver a control and evaluation unit for evaluating the light receiver signal of the light receiver, and an output for a sensor signal that is formed by the control and evaluation unit on the basis of the light receiver signal, wherein the identification marking has lettering or a marking, the at least one light transmitter comprising at least two light transmitters, the at least two light transmitters being arranged in a row;
projecting an elongate illumination field with the light transmitter onto a region of the identification marking narrow in a direction of movement;
adapting a geometry of the elongate illumination field by selectively engaging and disengaging selected ones of the at least two light transmitters; and
the control and evaluation unit comparing a reception signal sequence having a plurality of contrast transitions with a stored reception signal sequence and outputting the sensor signal in dependence on the comparison.

10. The method in accordance with claim 9, wherein the detection accuracy can be set, wherein the detection accuracy comprises a degree of agreement between the reception signal sequence and the stored reception signal sequence.

11. The method in accordance with claim 9, wherein a background signal is stored.

12. The method in accordance with claim 9, wherein at least one start trigger is determined from the identification marking, with the reception signal sequence being evaluated for a constant time period from the start trigger onward.

13. The method in accordance with claim 9, wherein at least one start trigger is determined from an input signal, with the reception signal sequence being evaluated for a constant time period from the start trigger onward.

14. The method in accordance with claim 9, wherein at least one start trigger and one end trigger is determined from an input signal, with the reception signal sequence between successive start and end triggers being evaluated.

* * * * *